United States Patent [19]
Sirosh et al.

[11] Patent Number: 6,041,762
[45] Date of Patent: Mar. 28, 2000

[54] CONTROL MODULE FOR NATURAL GAS FUEL SUPPLY FOR A VEHICLE

[75] Inventors: Neel Sirosh, Irvine; Syed Hussain, Anaheim Hills; Eric G Adler, Irvine; David Marley, Santa Ana, all of Calif.

[73] Assignee: IMPCO Technologies, Inc., Cerritos, Calif.

[21] Appl. No.: 09/134,777

[22] Filed: Aug. 15, 1998

Related U.S. Application Data

[60] Provisional application No. 60/055,922, Aug. 16, 1997.

[51] Int. Cl.$^7$ .................................................. G05D 16/00
[52] U.S. Cl. ...................... 123/529; 123/527; 137/505.25
[58] Field of Search ................................... 123/527, 529; 137/505.25

[56] References Cited

U.S. PATENT DOCUMENTS

| | | | |
|---|---|---|---|
| 5,025,758 | 6/1991 | Djurdjevic | 123/527 |
| 5,193,580 | 3/1993 | Wass et al. | 251/144 X |
| 5,197,710 | 3/1993 | Wass et al. | 251/144 X |
| 5,330,031 | 7/1994 | Hill et al. | 123/527 X |
| 5,341,844 | 8/1994 | Wass et al. | 251/144 X |
| 5,452,738 | 9/1995 | Borland et al. | 251/144 X |
| 5,458,151 | 10/1995 | Wass | 251/144 X |
| 5,562,117 | 10/1996 | Borland et al. | 251/144 X |
| 5,566,713 | 10/1996 | Lhomer et al. | 137/505.25 X |
| 5,611,316 | 3/1997 | Oshima et al. | |
| 5,829,418 | 11/1998 | Tamura et al. | 123/529 |

*Primary Examiner*—Gerald A. Michalsky
*Attorney, Agent, or Firm*—Edward A. Sokolski

[57] ABSTRACT

The controls for controlling the supply of natural gas fuel for a vehicle are integrated together in a module which is located at the gas tank. Such controls include a high pressure regulator for lowering the pressure of the gas flowing from the tank and an electronically controlled solenoid valve which shuts off the gas flow when no fuel is required by the engine and when the gas pressure in the tank falls below a predetermined value. Also included in the module are a pressure sensor for providing signals for controlling the shutoff valve; a check valve which permits one way flow of gas into the gas tank when it is filled; a pressure relief mechanism responsive to the temperature and pressure sensors for allowing safe release of the gas to the outside should the temperature rise above a predetermined limit. The solenoid valve, as indicated above, responds to the sensors and additionally functions as an excess flow shut off valve to cut off gas flow from the tank should the gas line rupture or the module is sheared off.

9 Claims, 3 Drawing Sheets

CONTROL MODULE FOR NATURAL GAS FUEL SUPPLY FOR A VEHICLE

Continuing status for this application is claimed from Provisional Application No. 60/055,922 filed on Aug. 16, 1997.

BACKGROUND OF THE INVENTION

1. Field of the Invention

This invention relates to natural gas fuel supply for a vehicle engine and more particularly to a control module for controlling the feeding of gas between a fuel tank and the engine.

2. Description of the Related Art

The use of natural gas as a vehicle engine fuel has substantial environment benefits in that the exhaust emissions of an engine using such fuel are extremely low. Natural gas fuel, however, has low energy density which necessitates fuel storage in a vehicle in a highly compressed form to increase such density. This necessitates the regulation of the fuel pressure down to a lower value suitable for use in the vehicle combustion chamber. Due to this factor, the fuel supply system represents 60–90% of the cost of conversion of a vehicle to run on natural gas.

There are two fundamental requirements for a natural gas fuel supply system: 1. storing enough fuel to provide adequate travel range by compressing the fuel prior to its being fed into the fuel tank; 2. Regulating the compressed fuel down to a suitable pressure and temperature so that the air/fuel ratio can be controlled to achieve the required emissions and fuel economy objectives.

In prior art natural gas fuel supply systems such as described in U.S. Pat. No. 5,611,316 issued Mar. 18, 1997 to Oshima et al., the high pressure gas is fed through high pressure lines to the engine where the pressure is lowered and regulated by a suitable regulator and the feeding of the fuel controlled. In such prior art systems, the fuel line running between the gas tank and the engine and other related components must be able to handle the high pressure which necessitates the use of expensive materials such as stainless steel. Further, the feeding of the gas at high pressure presents the danger of leaks and evaporative emissions which could cause system breakdown along with the resultant hazards.

SUMMARY OF THE INVENTION

The present invention provides an improvement over the prior art by providing a fuel control module which integrates a high pressure regulator for reducing the pressure of the fuel with an electromagnetically controlled shutoff valve along with temperature and pressure sensors, a high flow shut off device, a check valve, and a safety relief device in a single rugged manifold which is mounted on the fuel tank. The pressure regulator reduces the pressure of the gas to a level suitable for use by the engine and the low pressure fuel fed through normal fuel lines to the engine. Also included in the module are pressure and temperature sensors for providing signals for controlling a shutoff valve and a pressure relief mechanism to allow safe release of the gas should the temperature rise above a predetermined limit and a check valve which permits only one way flow of gas into the tank when it is filled.

It is therefore an object of this invention to provide an improved control device for controlling the natural gas fuel supply to a vehicle engine.

It is a further object of this invention to obviate the need for high pressure fuel lines between the gas tank and the engine in a natural gas driven engine.

Other objects of the invention will become apparent from the following description taken in connection with the accompanying drawings.

DETAILED DESCRIPTION OF THE INVENTION

Referring now to the Figures, a preferred embodiment of the invention is illustrated.

Figure 1:
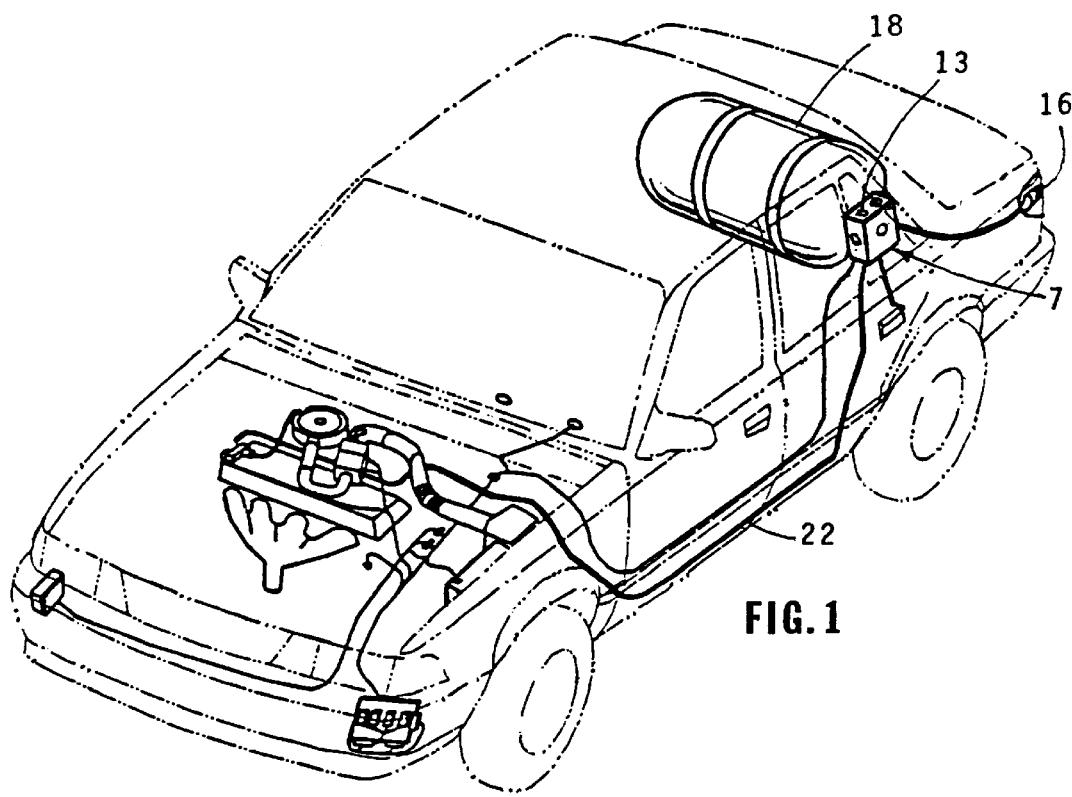
FIG. 1 is a perspective schematic view illustrating the device of the invention installed in a vehicle.
Figure 2:
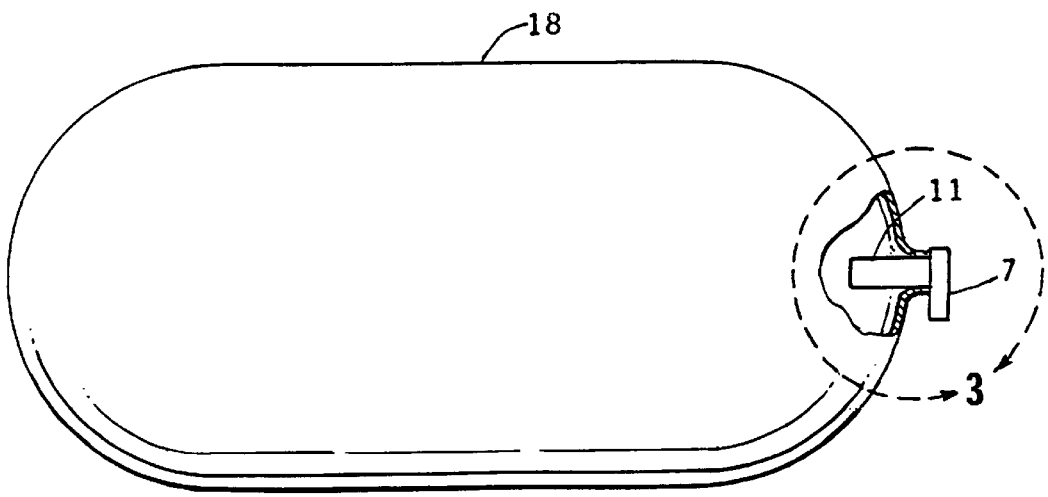
FIG. 2 is a schematic view illustrating the installation of the module of the invention in a gas tank.
Figure 3:
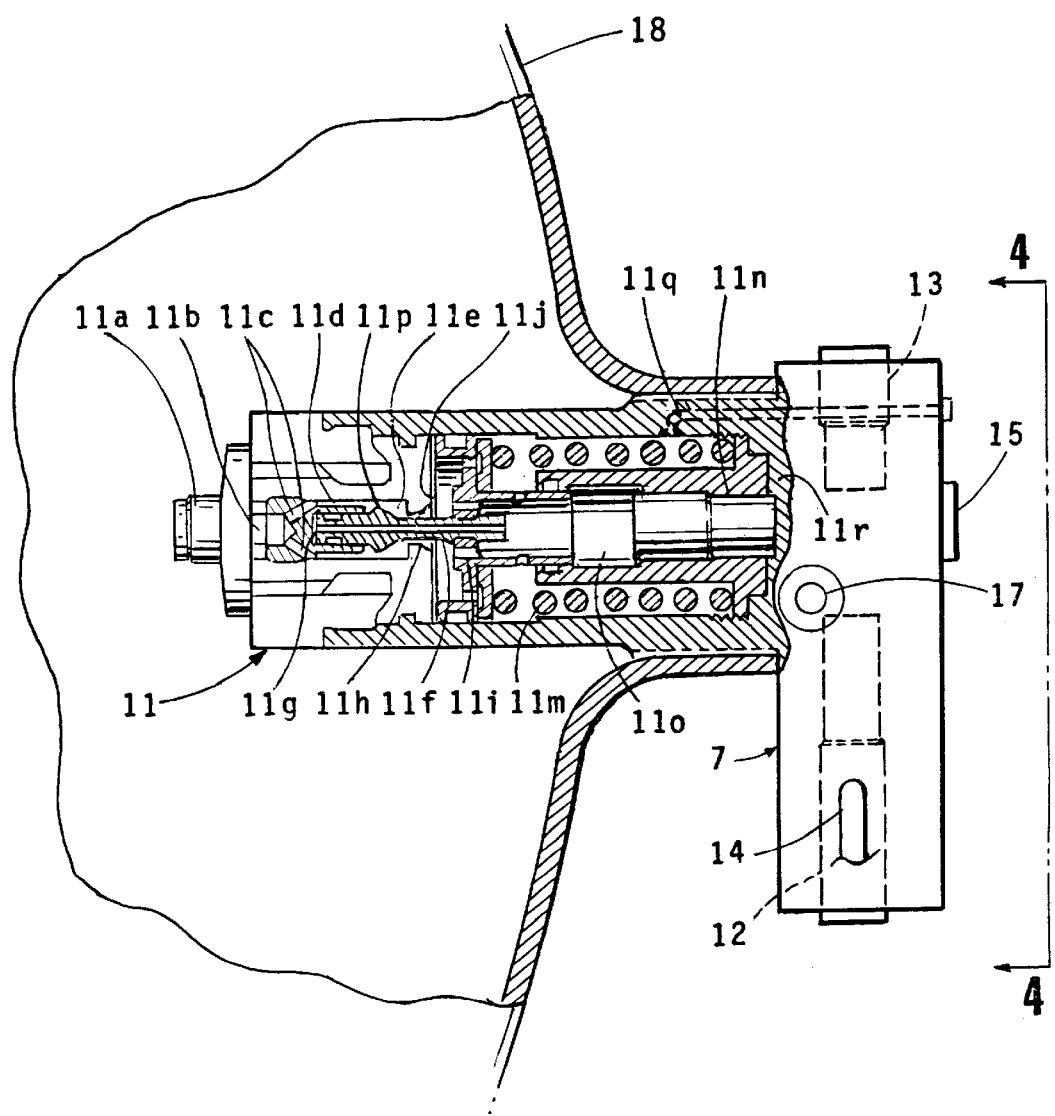
FIG. 3 is a side schematic view illustrating the module of the invention.
Figure 4:
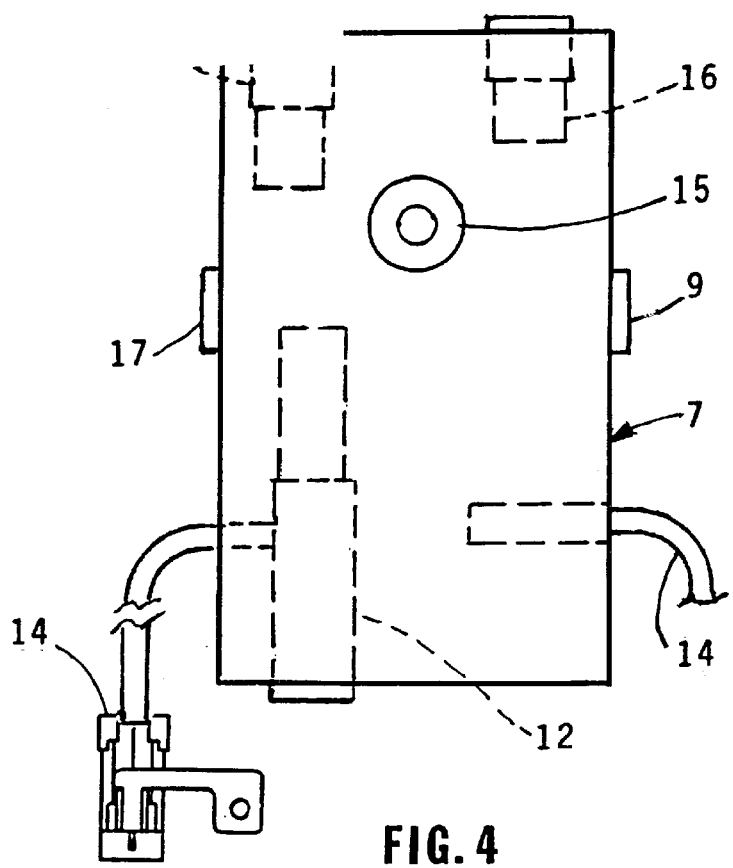
FIG. 4 is a view taken along the plane indicated by 4—4 in FIG. 3.
Figure 5:
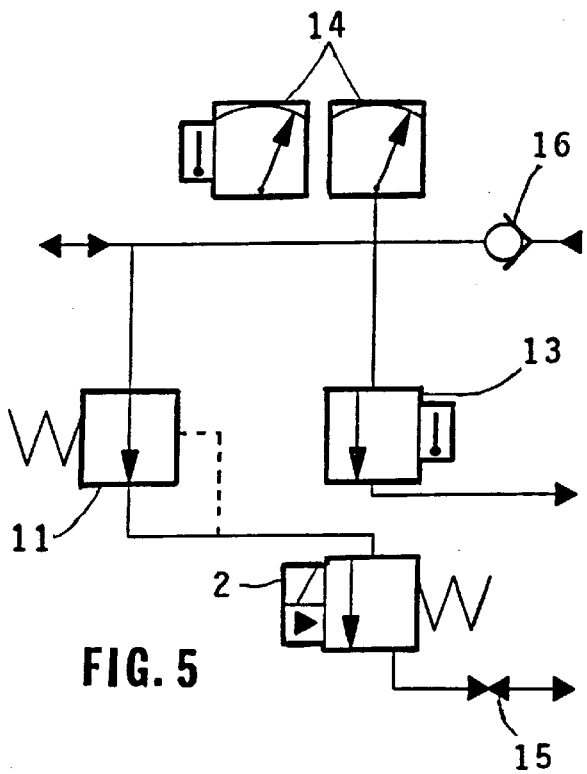
FIG. 5 is a block diagram illustrating the operation of the control system of the invention.

Integrated module 7 is attached to the wall of tank 18 with a portion thereof, high pressure regulator 11 extending into the interior of the tank, as shown in FIG. 3. Mounted on or within module 7 are regulator 11, pressure and temperature transducers 14, pressure relief device 13 and check valve 16.

Pressurized natural gas is filled in tank 18 through check valve 16 which only allows unidirectional flow, i.e. flow into the tank. The pressurized gas in tank 18 flows out of the tank through high pressure regulator 11 which extends into the tank. Regulator 11 may comprise a balanced poppet in line flow regulator which reduces the gas pressure of the gas fed from the tank from about 5,000 psi to about 160 psi. The regulator may have an overall diameter of less than two inches so that it fits conveniently in the neck of the tank with minimum overhang so that fatigue due to extended vibration is minimized. In order to prevent excessive cooling of the pressure regulator due to gas expansion and the Joule-Thomson effect, hot engine coolant is circulated around the regulator, this coolant being fed in through inlet 17 and exited through outlet 9.

Balanced pressure regulator 11 is an integral portion of the cap for tank 18 and is used to regulate the pressure of the gas fed to the engine within narrow limits. Compressed natural gas enters the high pressure chamber 11e of the regulator through inlet port 11a and filter element 11b and flows through inlet passageways 11c and around balancing chamber 11d into the high pressure chamber 11e. The balancing chamber 11g has the same area as poppet regulator seat 11h, assuming that the poppet 11p is not biased by upstream or regulated pressure. Poppet seat 11h is fixedly attached to balanced piston 11i which is slidably mounted in the casing. The balanced piston receives a biasing force from spring 11m in the direction towards pressurized gas inlet port 11a. Regulated pressure is communicated through a passage 11f in the balanced poppet 11p. Regulated pressure is sensed by the balance piston 11i and the poppet area exposed to the regulated pressure in chamber 11o. Upstream pressure in the high pressure chamber 11e is also balanced by the balance piston area and the regulator seat. Atmospheric pressure is ported through passage 11q to the back side of piston 11i.

When the pressure in high pressure chamber 11e exceeds the force of the regulator spring 11m and the atmospheric pressure sensed on the back side of the piston 11j, the piston is driven to the right and the poppet is unseated (as shown in FIG. 3) to permit flow of gas to outlet 11n. When the pressure in high pressure chamber falls below the force of the regulator spring, the piston is driven to the left to seat the poppet valve 11p and shut off the supply of gas to the outlet. It is to be noted that poppet valve 11p is fixedly mounted on the housing while poppet seating 11h is attached to slidably mounted balanced piston 11i. Whether the poppet valve is open closed is dependent on the relationship between the forces on the opposite surfaces of sensing piston 11j due to the gas pressures on these surfaces and the bias force of spring 11m on balance piston 11i. One end of spring 11m abuts against member 11r which is threadably attached to the housing. The unit can be calibrated by rotating member 11r to move this member laterally, thereby changing the bias force of the spring and determining the relative gas pressures on the opposite sides of sensing piston 11j needed to bring the poppet valve to either the open or closed position. In this manner, the difference between the pressure of the gas fed into regulator 11 and that fed out of the regulator is automatically maintained.

Pressure and temperature transducers 14 are provided in the module to provide signals in accordance with the temperature and pressure of the gas stored in tank 18 to monitor the mass of such gas. Signals from transducers 14 are also used to control solenoid valve 12 to shut off flow from the tank when the pressure goes below a predetermined level. Maintenance of a low pressure threshold in the tank allows control of the extent of compression heating or Joule-Thompson cooling of gas during filling or venting.

Solenoid valve 12 also functions as an excess flow shut off valve such that the flow of gas from the tank is cut off in case the fuel control module is accidentally sheared off or if the gas line to the engine ruptures.

Pressure relief device 13 allows safe release of gas from the tank to the outside if the temperature rises above a predetermined limit. Pressure relief device 13 employs a metallic fusible eutectic material that activates within a narrow temperature range, allowing release of the gas. This device ensures that the gas pressure in the tank is safely released if the temperature rises, as in the case of a fire.

Gas flow from the tank to the engine can be controlled by means of solenoid valve 12 which is normally closed and only permits a flow of gas when electrically activated. Thus a current control switch can be utilized to activate and deactivate valve 12 to provide gas flow to the engine as may be desired.

It is to be noted that while the device of the invention is disclosed as utilized in conjunction with a natural gas supply to an internal combustion engine, this device could also be employed in conjunction with other fuel gasses such as methane and hydrogen and for the fuel supply for other devices such as a fuel cell device.

While the invention has been described and illustrated in detail it is to be understand that this is intended by way of illustration and example only, the scope of the invention being limited by the terms of the following claims.

We claim:

1. In a vehicle having an engine capable of operating with gaseous fuel, a fuel tank having pressurized gaseous fuel therein and a fuel line for feeding gaseous fuel from the tank to the engine, the improvement comprising:

a pressure regulator mounted in the interior of said tank for lowering the pressure of said gaseous fuel, said pressure regulator being connected between the interior of said tank for feeding lowered pressure gaseous fuel to said engine.

2. The system of claim 1 and further including a control module mounted on said tank for controlling the supply of gaseous fuel to the engine and wherein the pressure regulator is part of said control module and extends from the main body thereof.

3. The system of claim 2 wherein said module includes electrically controlled valve means responsive to an electrical signal of a predetermined minimum amplitude, said valve means shutting off the feeding of gaseous fuel to said engine when said minimum amplitude electrical signal is not being fed thereto.

4. The system of claim 3 and additional including temperature and pressure transducers incorporated in said module for generating electrical control signals in accordance with the temperature and pressure of the gas being fed to the engine respectively, the electrical control signals from said transducers being fed to said electrically controlled valve means.

5. In a vehicle having an engine capable of operating on gaseous fuel, a fuel tank having pressurized gaseous fuel contained therein and a fuel line for feeding gaseous fuel from said tank to said engine, the improvement constituting a control module mounted on said tank for controlling the supply of gaseous fuel to said engine comprising:

a pressure regulator mounted on said module for lowering the pressure of said gaseous fuel, said pressure regulator extending from said module into the interior of said tank and connected to said line for feeding gaseous fuel to said engine, a pressure transducer incorporated in said module for generating an electrical signal in accordance with the pressure of the gaseous fuel being fed to said engine, a temperature transducer incorporated in said module for generating an electrical signal in accordance with the temperature of the gaseous fuel being fed to said engine, and electrically controlled valve means incorporated in said module responsive to a predetermined minimum amplitude electrical signal, said valve means shutting off the feeding of gaseous fuel to said engine when said minimum amplitude electrical is not being fed thereto, the signals generated by said sensors being fed to said valve means to cause said valve means to shut off the supply of gaseous fuel to said engine when the gaseous fuel temperature or pressure is below predetermined values.

6. The device of claim 5 wherein said electrically controlled valve means comprises a solenoid.

7. The device of claim 5 wherein said pressure regulator reduces the pressure of the gaseous fuel to a value of the order of 160 psi.

8. The device of claim 5 and further including means for feeding heated coolant from said engine to said pressure regulator to prevent excessive cooling thereof.

9. The device of claim 5 and further including a pressure relief device incorporated in said module to provide release of gaseous fuel from the tank in the event that the ambient temperature rises above a predetermined limit.

* * * * *

UNITED STATES PATENT AND TRADEMARK OFFICE
CERTIFICATE OF CORRECTION

PATENT NO. : 6,041,762
DATED : March 28, 2000
INVENTOR(S) : Neel Sirosh, et al.

It is certified that error appears in the above-identified patent and that said Letters Patent is hereby corrected as shown below:

Claim 1, column 4,
Line 2, between "tank" and "for", insert -- and said line --.

Signed and Sealed this

Thirtieth Day of October, 2001

Attest:

*Attesting Officer*

NICHOLAS P. GODICI
*Acting Director of the United States Patent and Trademark Office*